(12) United States Patent
Allen, Jr. et al.

(10) Patent No.: US 8,059,788 B2
(45) Date of Patent: Nov. 15, 2011

(54) TELEPHONE SOFTWARE TESTING SYSTEM AND METHOD

(75) Inventors: James J. Allen, Jr., Red Bank, NJ (US); Muharrem Umit Uyar, Holmdel, NJ (US); Michael Robert Lundberg, Holmdel, NJ (US); Diane Somers, Holmdel, NJ (US); Shashank Sarwate, Ocean, NJ (US); William Howard Chriss, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1088 days.

(21) Appl. No.: 11/769,472

(22) Filed: Jun. 27, 2007

(65) Prior Publication Data
US 2009/0003534 A1 Jan. 1, 2009

(51) Int. Cl.
*H04M 1/24* (2006.01)
(52) U.S. Cl. .................................. 379/27.01; 379/27.04
(58) Field of Classification Search ............... 379/27.01, 379/27.04
See application file for complete search history.

(56) References Cited

U.S. PATENT DOCUMENTS

| | | | | |
|---|---|---|---|---|
| 5,473,666 | A | * | 12/1995 | Szczebak et al. ................. 379/3 |
| 5,757,680 | A | * | 5/1998 | Boston et al. ................. 702/121 |
| 5,781,720 | A | | 7/1998 | Parker et al. |
| 6,104,304 | A | * | 8/2000 | Clark et al. ................... 340/664 |
| 6,226,407 | B1 | | 5/2001 | Zabih et al. |
| 7,321,766 | B2 | * | 1/2008 | Liu et al. ....................... 455/425 |
| 2002/0157033 | A1 | * | 10/2002 | Cox ................................. 714/1 |
| 2002/0196029 | A1 | * | 12/2002 | Schmidt ....................... 324/500 |
| 2004/0203467 | A1 | * | 10/2004 | Liu et al. .................... 455/67.14 |
| 2007/0011484 | A1 | | 1/2007 | Chriss et al. |

* cited by examiner

*Primary Examiner* — Creighton Smith
(74) *Attorney, Agent, or Firm* — Muncy, Geissler, Olds & Lowe, PLLC

(57) ABSTRACT

The present invention provides a system and method for a computer controlled test system in which the computer can change and monitor the compound observable state of an electronic device or telephone during testing procedure. In the preferred embodiment of the invention, the compound observable state of the electronic device includes a display bit map file or the status of lights or buttons. The compound observable state can be evaluated by the computer in real-time to alert nearby operators of a failure (i.e. a telephone that needs to be rebooted) or malfunction (not rising to the level of a failure). Also, the data related to the compound observable state can be stored in the computer for later review to assist in debugging the telephone's software.

25 Claims, 8 Drawing Sheets

TELEPHONE SOFTWARE TESTING SYSTEM AND METHOD

BACKGROUND OF THE INVENTION

1. Field of the Invention

The present invention relates to a test system for desktop telephones and more particularly, to a system and method for the automated group testing of a plurality of telephones by a test application device such as a computer.

2. Description of the Relevant Art

Desktop telephones have internal software programs with numerous operational routines, which must operate in a trouble free manner for the end user. When designing software for a new telephone, the software engineer must debug the software before the telephones can be released to the public. When debugging the software often plural telephones (e.g. 20 telephones) are networked together. A test application device such as a computer typically controls the network and can input control signals directly to each telephone of the network.

These control signals cause the telephones to actually perform certain operations. The computer can send first control signals to a first telephone to cause the first telephone to call a second telephone. The first control signals cause the first telephone to perform as if certain keystrokes were entered into the keypad of the first telephone. Thereby, the first telephone can be made to dial the extension number of the second telephone. Then, the second telephone can answer the call, when the computer activates the speaker phone key of the second telephone. Next, the second telephone can transfer the call, when the computer making the second telephone activates a soft key for the transfer function followed by dialing an extension of a third telephone.

Such a test application computer does not cause buttons on the phones to be physically depressed. Rather, the computer causes the telephone to generate the internal signal associated with the pressing of a particular button. The software of the telephones is programmed to accept this computer input to control simulated keystrokes.

The computer may run thousands of telephone operations among the plurality of telephones in order to test various functions of the telephone in varying combinations and for varying durations. This form of comprehensive testing will almost certainly reveal bugs in the software programs running in the telephone under test, which must be addressed by a software engineer before the new telephones may be released to the public.

Testing operators are physically present during the testing. The operators watch the telephones undergoing the testing procedure to determine when a bug in the software occurs. Often one of the telephones will freeze up and need to be reset or rebooted. The reset or reboot may be performed by momentarily unplugging the telephone. Some other types of telephones may automatically reset or reboot themselves.

When a failure is observed, the testing operator makes note of the processes being run by the computer at the time of failure, i.e. the stage of the computer test program. Later, the computer program can be started at a point prior to the noted failure stage and the telephone failure can be replicated and more closely observed to pinpoint the timing and nature of the operation being performed when the failure occurred in order to troubleshoot the software program.

A drawback of the prior art testing methods is that the operator must be physically present and carefully observe the telephones. The operators cannot leave the telephones unattended and simply return three or four hours later. If the operators did so, they would most likely return to a computer running its testing program and several telephones in frozen states. The operators would have no way of knowing when the telephones froze, the operations being perform at the point of failure, and/or the sequence of simulation events being performed by the computer just prior to the event which lead to the failure. The operators would only know that sometime within the last three or four hours, a failure occurred and the test needs to be started over again and the telephones observed to determine the point of failure. In order to understand the failure situation, not only the expected responses to the applied test inputs, but also the plurality of status of lamps, LEDs, screens, and the status of buttons, must be watched over long periods of time over the plurality of telephones. These actions can be prohibitively difficult and time consuming for a plurality of complex telephones.

Watching the telephones during a test becomes tedious and stressful. Also, many bugs in the software go unnoticed by the testing operators. For example, if the bug does not result in a telephone freezing up, but a mere momentary erroneous display of data on the telephone, it is unlikely that the testing operator will notice the failure and take note of it for later software debugging.

Attempts have been made to automate the testing of software, and one such attempt is described in U.S. Pat. No. 5,781,720, entitled "Automated GUI Interface Testing", by Parker et al. The '720 patent discloses a method for automated testing of both new and revised computer application programs which use a Graphical User Interface (GUI). Simulated user events such as keyboard or mouse actions are automatically input into the GUI interface which is displayed on a screen in accordance with a bitmap. The GUI is then monitored to observe the changes to the GUI in response to the input. The changes may be monitored by a computer utilizing a difference analysis technique.

Difference analysis refers to the process of comparing two observables and reporting the differences. The term observable refers to any information about the application or screen which can be captured automatically. Such observables include bitmaps, characters or texts. In situations where differences are expected and not significant, a filter may be specified by the programmer to automatically mask out insignificant differences. Bitmaps often contain areas where differences are considered insignificant. For example, the current date and time is the type of information which, if not masked out, would guarantee that the screens are never the same. This problem is solved by specifying a set of inclusion/exclusion regions which can be used to mask areas of the screen where differences are not considered significant. The actual method of difference analysis depends on the type of the observable. The '720 patent describes several types of difference analysis.

One type of difference analysis described in the '720 patent is bitmap difference analysis which involves comparing the pixels of two bitmaps. The analysis starts by checking the sizes of the bitmaps. If the bitmaps are not the same size, they are considered different. If they are the same size, the color of each pixel in the two bitmaps is compared until either a difference is detected or all pixels have matched. A second type of analysis described in the '720 patent is character screen difference analysis which compares the characters and the attributes of two screens. The analysis starts by checking the sizes of the screens. If the screens are not the same sizes, they are considered different. If they are the same size, the characters and their attributes are compared. A third type of difference analysis is text difference analysis which compares the contents of two text files, and if there are differences between the text files, the changes are noted.

U.S. Pat. No. 6,226,407, by Zabih et al., and entitled "Method and Apparatus for Analyzing Computer Screens" also discloses a method for quantitatively measuring differences in bitmap images on a computer screen using computer vision techniques. The bitmap images correspond to the rendered screens of two applications based on the same data source file. The '407 patent also discloses filtering unimportant areas of the screen. After rendering a series of screens for each application, the bitmap images are captured and interpreted to produce machine-readable visual attributes of the rendered screens. Corresponding attributes from each of the two applications are then compared to generate a set of differences. The attributes and differences are then processed to derive a set of grades reflecting the similarities between the rendered screens of the two applications.

While the difference analysis methods of the '720 patent and '407 patent are useful in analyzing the differences between a correct display of information and incorrect display of information on a computer screen, these prior art techniques are not adequate for software controlled telephones. Modern software controlled telephones can include a large number of buttons and secondary displays such as lamps, LEDs, and buttons. If the errors in these modern telephones are related to a mechanical input devices, such as the buttons, or the secondary displays, such as LEDs or lamps, in addition to the software errors, there is no way to conveniently correlate the error to the mechanical input device or secondary display.

Accordingly, there is a need for a testing method that can do more than simply detect the occurrence of an error by analyzing the differences between a correct display of information and incorrect display of information. More specifically, there is a need for a testing method that can identify an error associated with a mechanical button or secondary display of a telephone, and provide the test operator with the ability to step back through a plurality of error reports to pinpoint the source of the errors.

SUMMARY OF THE INVENTION

The present invention is directed to a method and system for testing a software controlled telecommunications device. External test signals from external devices are emulated, and the buttons associated with the telecommunications device are manipulated either physically or virtually, in order to emulate internal test signals. A compound observable state of the telecommunications device is determined from the internal test signals and the external test signals. A current compound observable state of the telecommunications device is compared to a stored version of the correct current compound observable state of the telecommunications device. The compound state of the device includes the status of the LEDs and lamps (on, off, blinking, etc.), position of buttons (up, down, depressed, released, etc.), and the contents of entire or certain parts of the screens. An error report is generated when the current compound observable state of the telecommunications device differs from the stored version of the correct current compound observable state of the telecommunications device. The method allows a test operator or a tester device to step through the compound observable states of the telecommunications device to locate the compound observable states corresponding to the error reports. A programmer can then debug the software of the telecommunications device to correct the programming problem that caused the incorrect compound observable states to occur.

DESCRIPTION OF PREFERRED EMBODIMENTS

Figure 1:
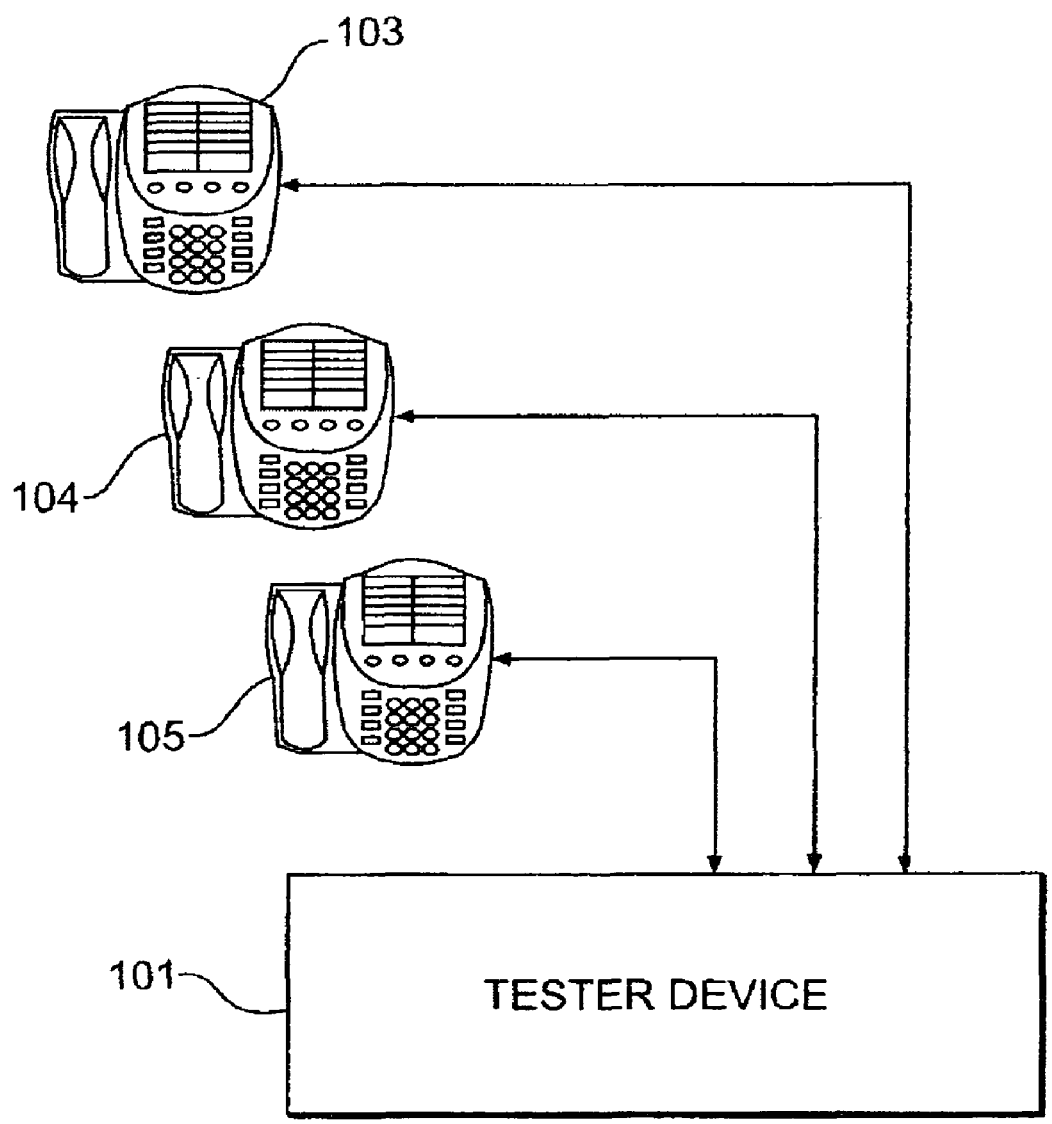
FIG. 1 is a block diagram which illustrates a test system for a plurality of telephones and a switch.

Referring now to FIG. 1, a first high-level architecture of a telephone test lab 100 used to practice the method of the present invention is shown. The test lab 100 may include a plurality of telephones 103-105 and a tester device 101. The tester device 101 is preferably a suitably programmed general purpose computer. The tester device 101 runs predetermined test scripts, and it emulates various user stimuli, such as signals generated by button pushes. The tester device 101 also controls the application of signals from external devices to each of the telephones 103-105. The tester device 101 is preferably coupled to a phone bank which includes approximately fifty telephones. In FIG. 1, only representative telephones 103, 104 and 105 are illustrated.

Each of the telephones 103, 104 and 105 includes a main display, a plurality of push buttons, and a plurality of LEDs, lamps and secondary display devices associated with the push buttons. The image on the main display of the telephone is produced by the telephone providing a bit map file to a display driver circuit which drives the main display. Similarly, the information about the status of the LEDs and lamps (on, off, blinking, etc.), the states of the push buttons (up, down, depressed, released, etc.), status of other parts of the device (such as mute, speaker, and head set indicators, etc.), and other secondary display devices can be provided by the telephone under test. According to the present invention, the compound observable state of the telephone under test comprises the contents of the combination of the display devices, status of the LEDs, lamps, and other secondary display devices, and the positions of the push buttons and other parts of the device. In addition, the bit map file (entirely or partially), status of the LEDs, lamps, and other secondary display devices, and the positions of the push buttons, and other information related to the observable compound state of the telephone under test are transmitted outside of the telephone to another device such as tester device 101.

The information contained in the bit map file, LED, lamp and other secondary display devices and the push button positions of telephone 103 collectively represent the compound observable state of the telephone 103 at a given point in time. The contents of this compound observable state of telephone 103 are the result of signals generated by the tester device 101 after they have been processed by the software of telephone 103. The signals generated by tester device 101 emulate either the signals internally generated within the telephone 103, or externally of the telephone 103 by other devices such as telephones 104 or 105 or by switching devices.

In the testing procedure, this compound observable state of telephone 103 is communicated to the tester device 101 and compared to the expected results stored in the memory of tester device 101, which may include the expected bit map file, expected LED and lamp states (on, off, blinking. etc.), push button positions (on, off, up, down, depressed, released, etc.), status of other parts of the device (such as mute, speaker, and head set indicators, etc.) or other outputs for the telephone based upon the progress of the test application computer's testing routine. The tester device 101 compares the output generated by the telephone 103 with the expected output. If the bit map file from telephone 103 is different from the expected one, the status of the LEDs and lamps is different than the expected ones, or the push button positions are not as specified, the tester device 101 will know that a failure has occurred and can provide an instant alert to the operator.

In the present invention, the information about the expected compound observable state of telephone 103 may be stored in the memory of tester device 101 in association with the timing and/or testing steps being performed by the tester device. If a testing operator returned to the testing area after a two-hour absence and finds that an error is flagged by tester 101 for two telephones 103, 104, the testing operator need only check and verify the difference between the stored compound observable output information and the one generated by the telephones. Then, the testing operator would be able to see the series of associated inputs applied to telephones 103 and 104 before and when the failure occurred. This step may be automated by the tester device 101 or other computer performing the search and providing a visual display of the results.

Figure 2:
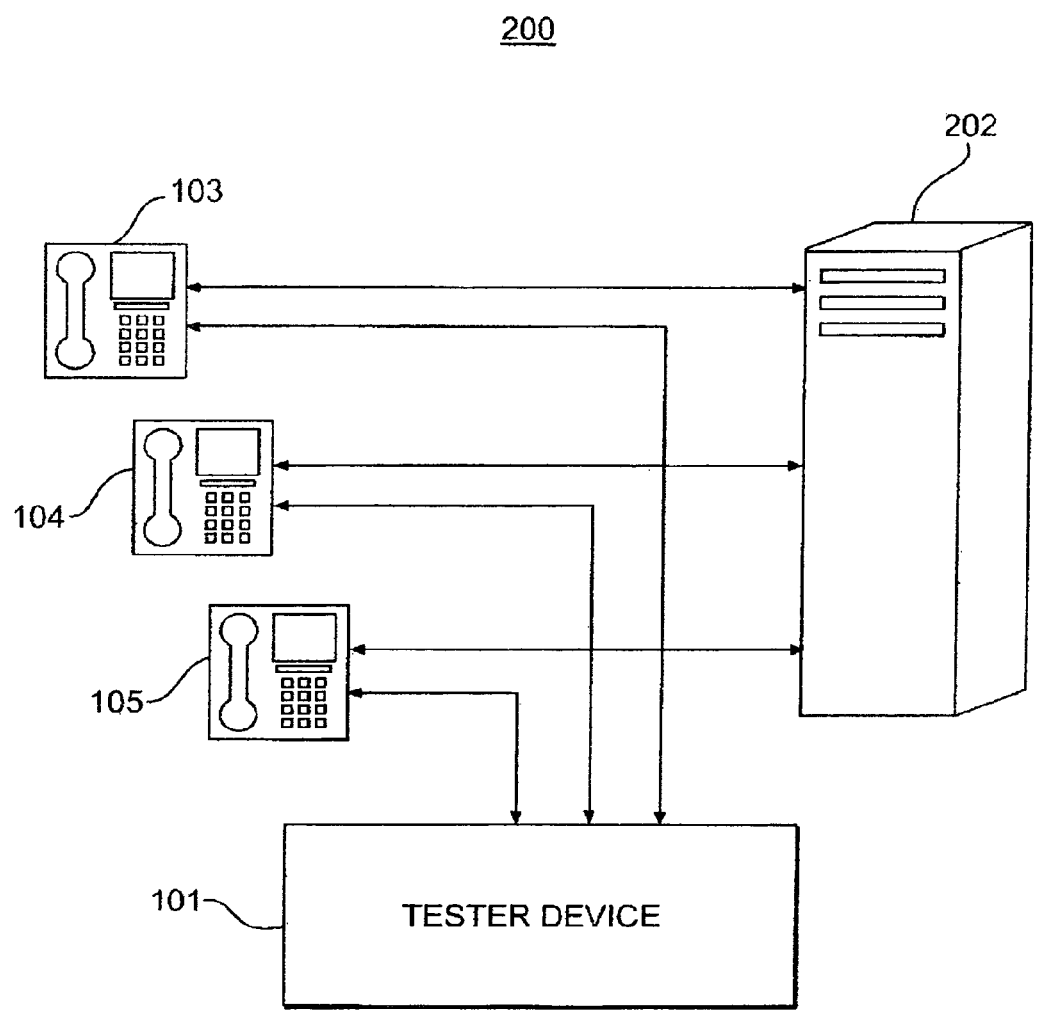
FIG. 2 is a block diagram which illustrates a test system for a plurality of telephones.

Referring now to FIG. 2, a second high-level architecture of a test lab 200 used to practice the method of the present invention is shown. The test lab 200 may include a plurality of telephones 103-105, a tester device 101 and a switch 202. The switch 202 establishes connections between the telephones 103-105. Both the tester device 101 and switch 202 are preferably coupled to a phone bank which includes approximately fifty telephones.

Figure 3:
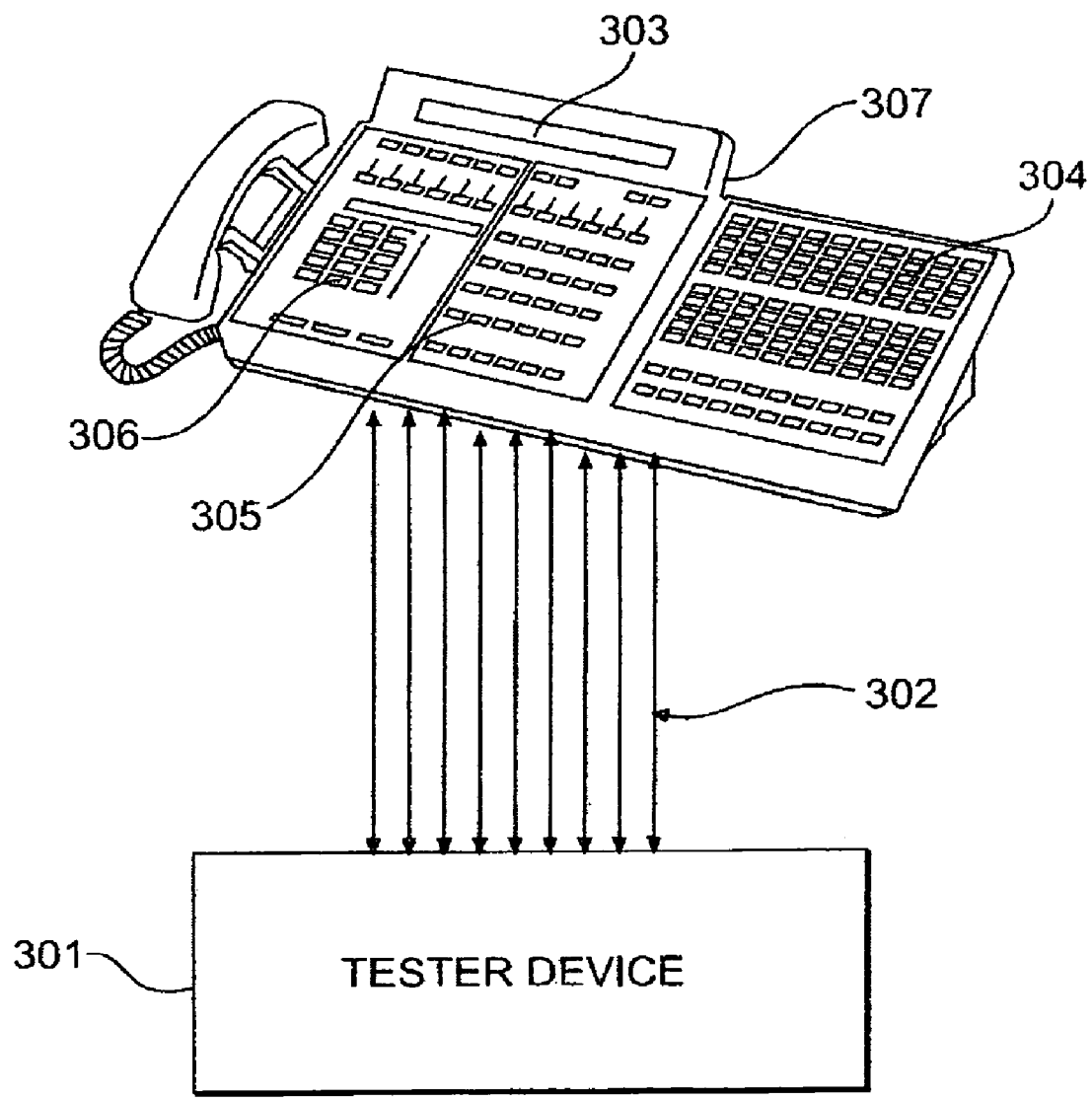
FIG. 3 is a block diagram which illustrates a test system for an attendant console.

Referring now to FIG. 3, a third high-level architecture of a test lab 300 used to practice the method of the present invention is shown. The test lab 300 includes an attendant telephone console such as console 307 and a tester device 301. The console 307 functions as a communications hub by managing calls and performing a variety of special functions such as handling incoming and outgoing calls, transferring calls, and putting calls on hold. The console 307 enables users to place a conference call or handle communications among a plurality of telephone lines 302. The console 307 includes a main display 303, and a plurality of push buttons 304-306 which may include associated LED's. The tester device 301 is coupled to the telephone lines 302. At any given time, the compound observable state of console 307 comprises entire or parts of the contents of the main display, the status of its LEDs and lamps (on, off, blinking, etc.), and the positions of the buttons (up, down, depressed, released, etc.) and other parts of the device (such as mute, speaker, head set indicators).

Figure 4:
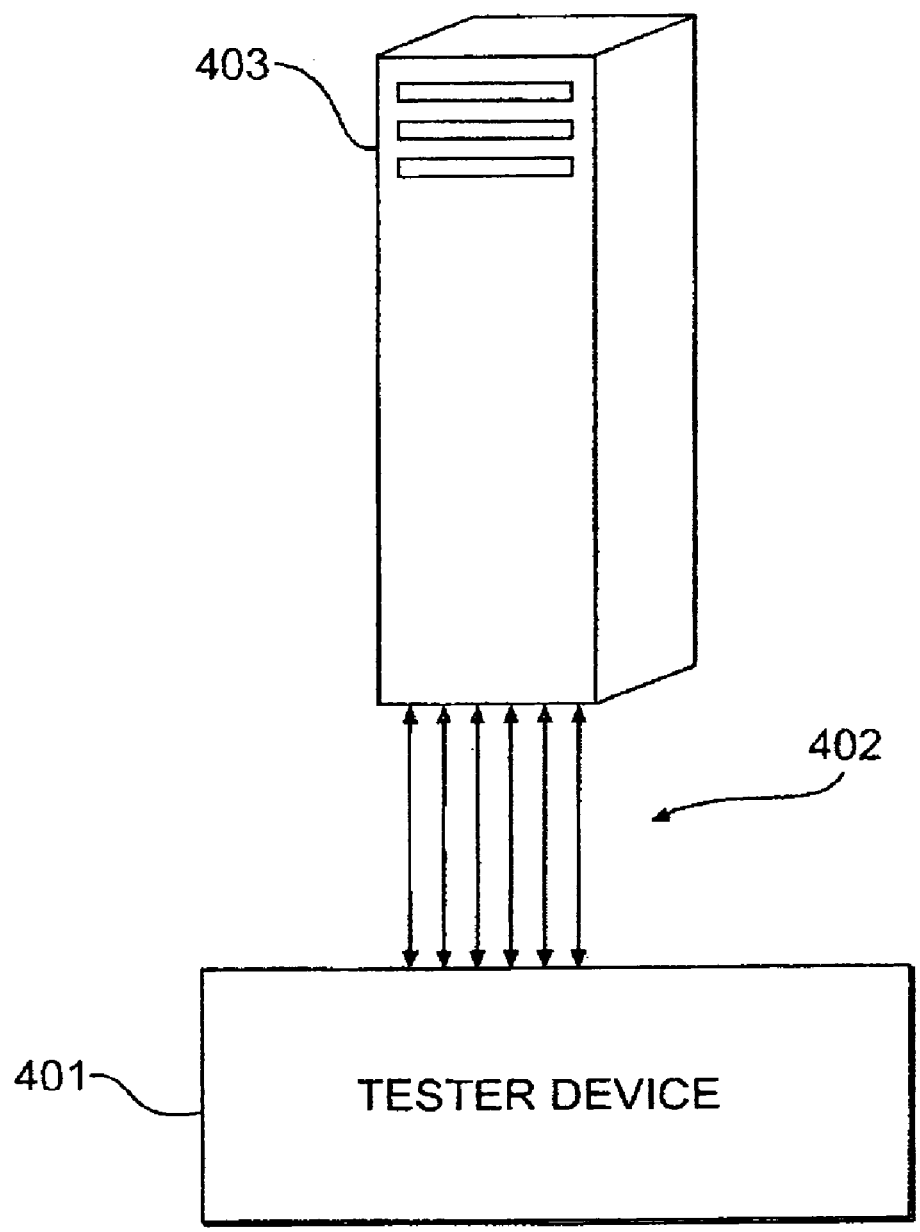
FIG. 4 is a block diagram which illustrates a test system for a switch.

Referring now to FIG. 4, a fourth high-level architecture of a test lab 400 used to practice the method of the present invention is shown. The test lab 400 includes a switch 403 and a tester device 401. The tester device 401 and the switch 403 are coupled together via telephone lines 402.

Figure 5:
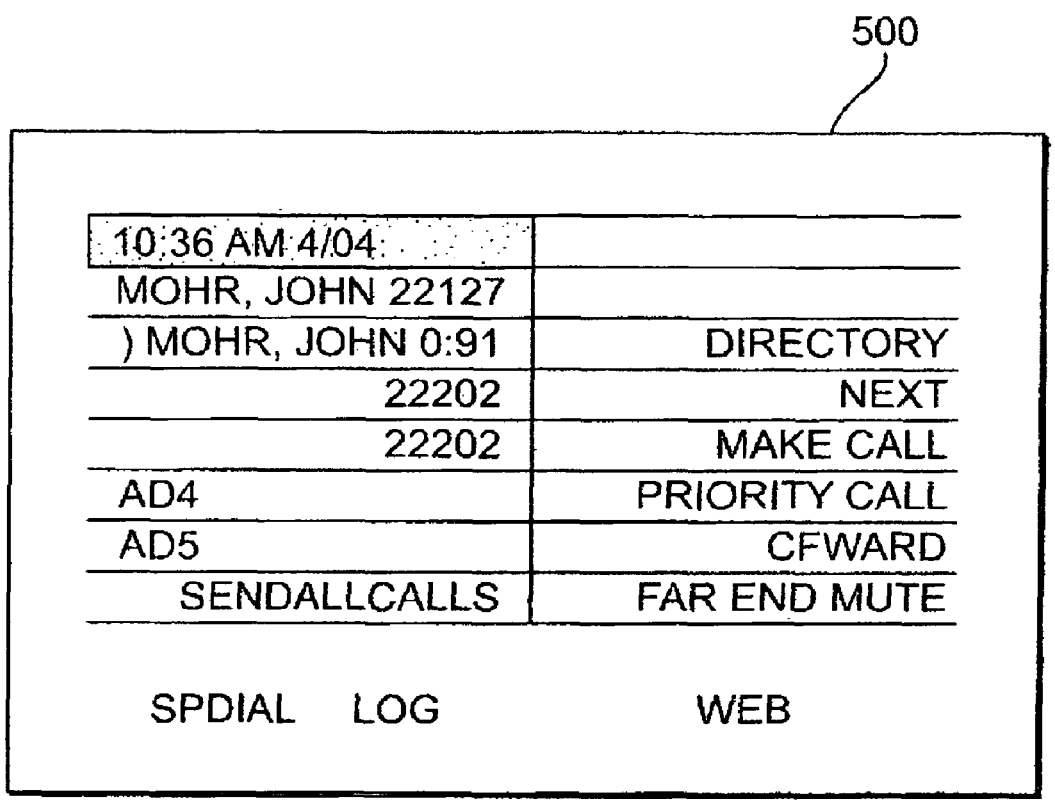
FIG. 5 illustrates a telephone display.

Referring now to FIG. 5, a display screen 500 of a software controlled telephone is illustrated. The display screen 500 may display information such as the time, date, name and extension of a called telephone device and functions associated with various push buttons. During the test mode, this display is generated with emulated signals provided by the tester device of the present invention.

Figure 6:
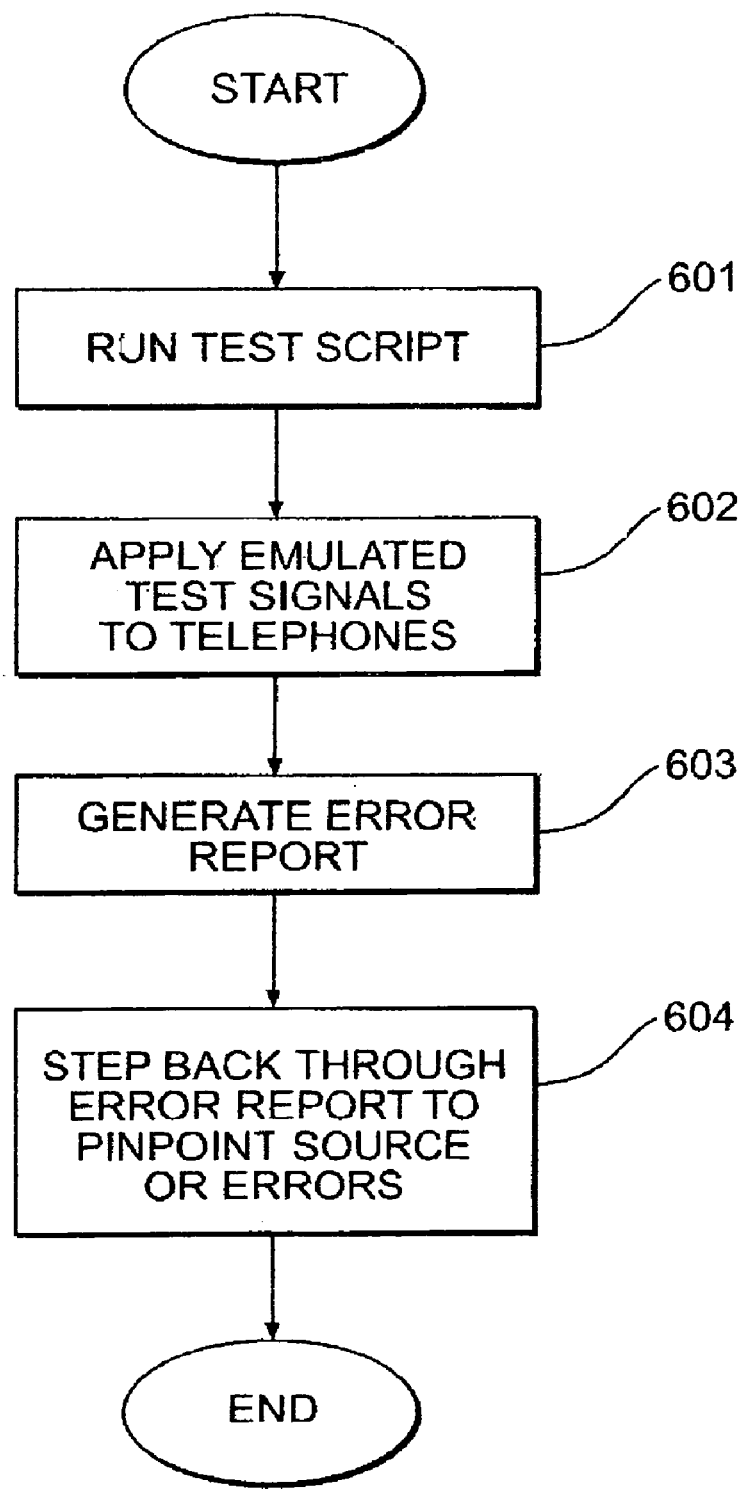
FIG. 6 is a flow chart describing the general overview and steps of the test method of the present invention.

Referring now to FIG. 6, a flow chart describes the general overview and steps of the test method of the present invention. In step 601, the tester device or computer runs a test script which specifies a plurality of emulation signals. The emulation signals which are external to the telephones under test are either generated by the tester device or some other external device, and the emulation signals which correspond to signals generated by the telephones in normal operation are preferably generated by routines running on the internal processors of the individual telephones. In step 602, the external and internal emulated test signals are applied to the telephones under test. In step 603, an error report is generated by the tester device in response to any errors which may occur during the application of the test emulation signals to the telephones under test. In step 604, the test operator or a computer is able to step back through the states of the telephone and error reports to determine the state of the telephone at the time the error occurred and to pinpoint the series of test signals which led to the error. The telephone software can then be debugged to prevent the errors from occurring during normal operation of the telephone.

Figure 7:
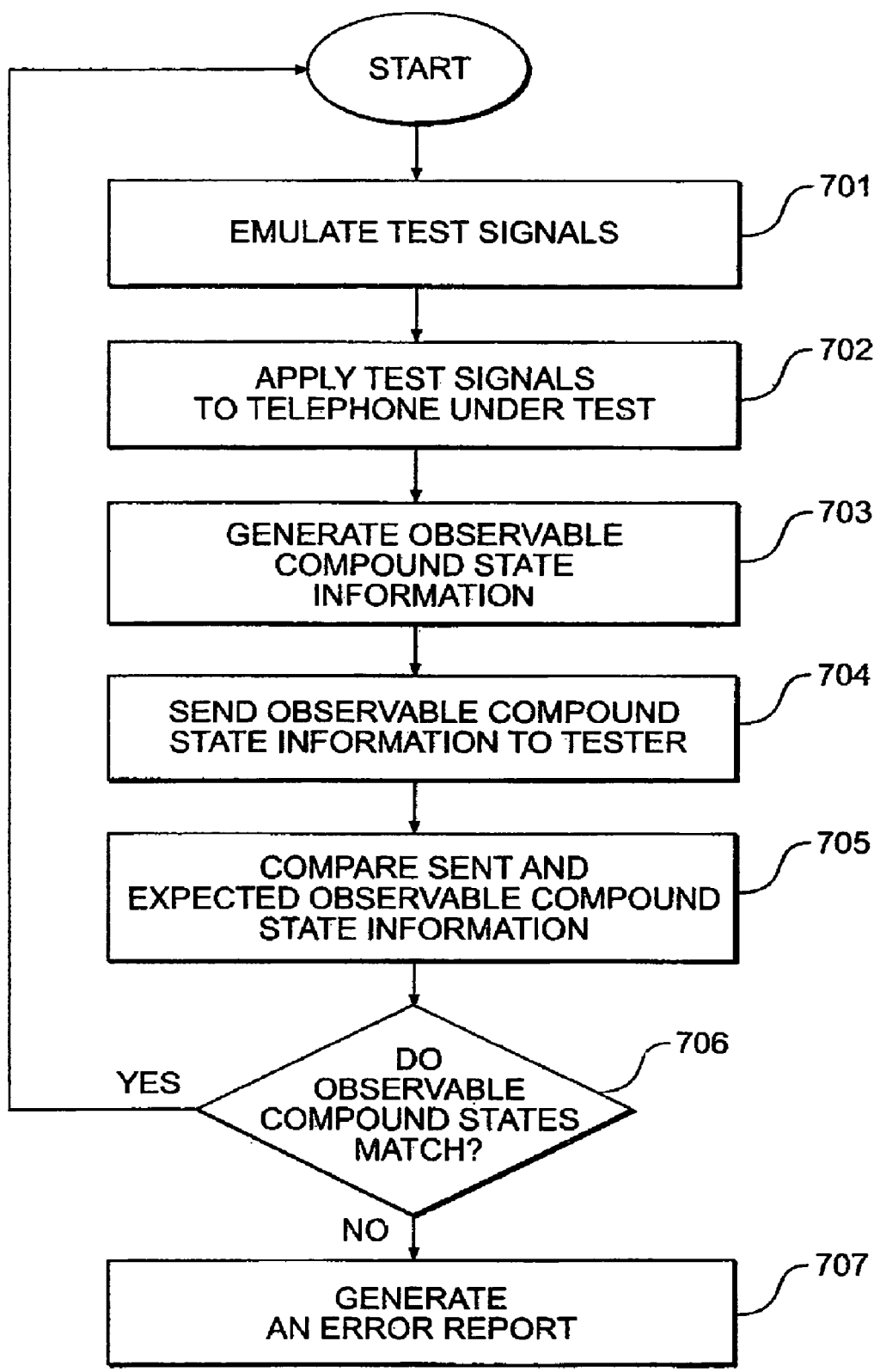
FIG. 7 is a flow chart describing the method for generating error reports.

Referring now to FIG. 7, a flow chart describes the method for generating error reports. The error reports are created in response to the emulated test signals of step 701. In step 702, the emulated test signals are applied to the processor of the telephone under test which is running a special test routine of the present invention. In step 703, an observable compound state is generated by capturing information including entire or parts of the contents of the main display, the status of its LEDs and lamps (on, off, blinking, etc.), and the positions of the buttons (up, down, depressed, released, etc.) and other parts of the device (such as mute, speaker, head set indicators) or some other electronic data representative of the current state of the telephone. In step 704, the observable compound state information is communicated to the tester device. In step 705, this observable compound state information is compared to a stored version of the expected correct state information. In step 706, a determination is made whether the newly acquired observable compound state matches the stored expected one. If they match in step 706, the tester device and the telephone under test continue to emulate test signals in accordance with the test script. If the observables do not match, an error report is generated in step 707.

Figure 8:
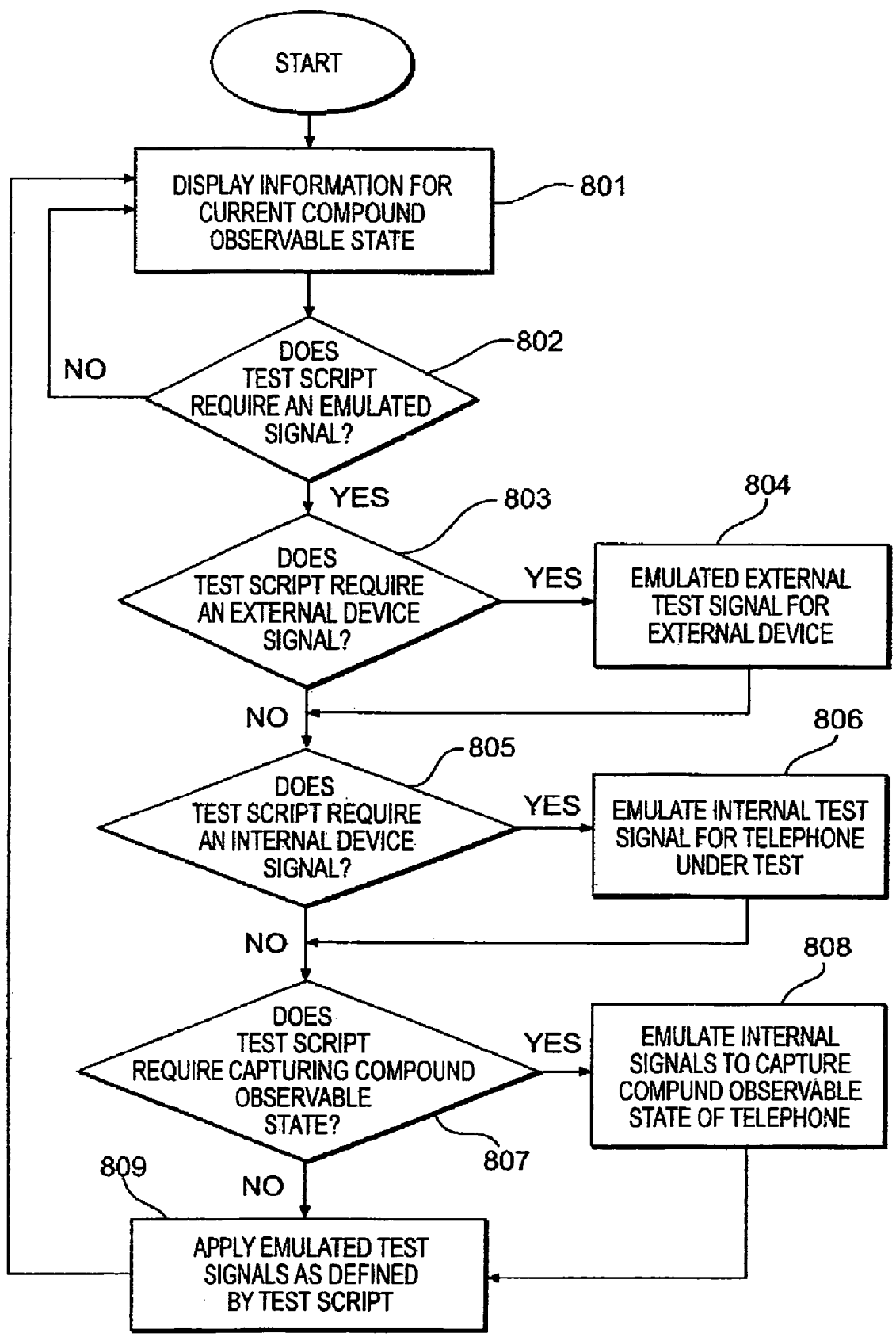
FIG. 8 is a flow chart describing the method for applying emulated test signals to a telephone.

Referring now to FIG. 8, a flow chart describes the method for applying and utilizing the emulated test signals to a telephone under test. One of the major problems associated with the automated testing of a telephone system is the requirement to emulate test signals that correspond to the signals generated during the normal operation of a telephone. In order to generate these emulated test signals, the current compound observable state of the telephone is determined in step 801. A determination is made in step 802 whether the test script has a present requirement for an emulated signal. A determination is made in step 803 whether the test script calls for the telephone under test to receive an external signal for example a test signal from a switch. If there is a requirement for an external test signal, the external test signal is generated by the tester device in step 804. A determination is made in step 805 whether the test script calls for the telephone under test to generate an internal signal, such as one corresponding to a button push. If there is a requirement for an internal test signal, the internal test signal is generated by the telephone in step 806 using the specialized software inside the telephone under test. A determination is made in step 807 whether the test script calls for the telephone to generate other test signals or the other portions of the observable compound state, such as one corresponding to the illumination of an LED. If there is a requirement for such an additional test signal, this additional test signal is generated by the telephone under test in step 808 using the specialized software inside the telephone under test. In step 809, the emulated test signals are applied to the telephone and then compound observable state of the telephone may be determined and displayed.

As mentioned above, the telephone under test preferably includes specialized software that is internal to the telephone and operational during the testing. This specialized software generates the internal device signals for the telephone under test, and these internal device signals contribute to changes in the compound observable states of the telephone. For example, a test script may require that the telephone to emulate a conference call. In order for the telephone to set up a conference call, it is ordinarily necessary to physically push a button on the telephone. Instead of physically causing the depression of a button, the specialized software generates an internal device signal or emulation signal corresponding to a button push, and the emulation signal causes the compound observable state of the telephone to change. In other words, the compound observable state may change to include the activation of an LED or text display indicating that the telephone under test is emulating a conference call.

Once the telephones have been fully tested and successfully debugged, the present invention contemplates that the specialized software which transmits the compound observable state out from the telephone would be disabled. This may be a permanent disabling so that the customer or others may not reactivate the routine to export the bit map file in the future for security reasons.

Alternatively, the specialized software may be set up to receive a code key which reactivates the software routine to export the bit map file. The code key may be a propriety code key known only to equipment provider. Equipment provider could use the code key to remotely troubleshoot the network of a customer at the customer's request.

In other words, if a customer complains about frequent telephone failures on their network, the equipment provider could schedule a time with the customer to test the telephone system, e.g. 2 am to 5 am on a Sunday, which is traditionally the lowest usage period for commercial telephones. During that time, the equipment provider could access the network telephones via the customer's server. The equipment provider would enter the code key to cause the telephones to export their display bit map files. Then, testing scripts could be remotely run by a tester device acting through the customer's internal network and the compound observable state files transmitted by the telephone under test to the tester and used to determine any faults in the software. This remote activation feature also has law enforcement possibilities, as the actual compound state of a user's telephone (caller ID data, numbers dialed with time and date being displayed, a user scrolling through a stored contacts list, etc.) may be stored for future reference.

The present invention provides several advantages over the prior art systems and methods. 1) The ability to insert stimulus and collect the information regarding the compound observable state, as opposed to simpler forms such as screen shots as in prior art, significantly enhances the failure and/or unexpected behavior detection compared to prior art. 3) The specialized test software resident in the telephone under test for exporting the observable compound state information may be deactivated prior to telephone production to protect customer privacy. 4) The specialized test software resident in the telephone under test for exporting the observable compound state information may be remotely reactivated by a coded key with the permission of the customer for remote debugging purposes. This specialized test software might also be remotely reactivated by law enforcement for surveillance purposes.

The invention has been described with reference to exemplary embodiments. However, it will be readily apparent to those skilled in the art that it is possible to embody the invention in specific forms other than those of the embodiments described above. This may be done without departing from the sprit of the invention. The exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for testing a software controlled telecommunications device, comprising:
   emulating a plurality of external test signals from external devices;
   manipulating physically or virtually a plurality of buttons associated with the telecommunications device, in order to emulate internal test signals;
   determining a compound observable state of the telecommunications device from the internal test signals and the external test signals;
   comparing a current compound observable state of the telecommunications device to a stored version of the correct current compound observable state of the telecommunications device; and
   generating an error report when the current compound observable state of the telecommunications device differs from the stored version of the correct current compound observable state of the telecommunications device.

2. The method according to claim 1 which further includes stepping through the compound observable states of the telecommunications device to locate the possible incorrect compound observable states that erroneously were implemented in the device.

3. The method according to claim 2 which further includes debugging the software of the telecommunications device to prevent the incorrect compound observable states from reoccurring.

4. The method according to claim 1 which further includes internal test signals which correspond to a secondary display.

5. The method according to claim 4 wherein the secondary display includes a plurality of LED's associated with the buttons of the telecommunication device.

6. The method according to claim 1 wherein the telecommunications device includes a bank of telephones and external test signals are communicated to the bank of telephones by a tester device.

7. The method according to claim 6 wherein external signals are communicate to the telecommunications device by a switch.

8. The method according to claim 1 wherein the telecommunications device includes a telephone attendant console and external signals are communicated to the telephone attendant console by a tester device.

9. The method according to claim 1 wherein the telecommunications device includes a switch and external signals are communicated to the switch by a tester device.

10. The method according to claim 1 wherein the compound observable state includes a bit map of a display associated with the telecommunications device.

11. The method according to claim 1 wherein the compound observable state includes a text file of a display associated with the telecommunications device.

12. The method according to claim 1 wherein the compound observable state includes characters and attributes of an image displayed on the telecommunications device.

13. The method according to claim 1 wherein at least a portion of the compound observable state is masked in order to hide insignificant information.

14. A test system for a software controlled telecommunications device, comprising:
   a tester device for emulating a plurality of external test signals from external devices;
   means for manipulating physically or virtually a plurality of buttons associated with the telecommunications device, in order to emulate internal test signals; and
   means for determining a compound observable state of the telecommunications device from the internal test signals and the external test signals;
   wherein the tester devices compares a current compound observable state of the telecommunications device to a stored version of the correct current compound observable state of the telecommunications device, in order to generate an error report when the current compound observable state of the telecommunications device differs from the stored version of the correct current compound observable state of the telecommunications device.

15. The system according to claim 14 wherein the testing device steps through the compound observable states of the telecommunications device to locate the incorrect compound observable states that generated the error reports.

16. The system according to claim 14 which wherein the telecommunication device generates internal test signals which correspond to a secondary display.

17. The system according to claim 16 wherein the secondary display includes a plurality of LED's associated with the buttons of the telecommunication device.

18. The system according to claim 14 wherein the telecommunications device includes a bank of telephones and external test signals are communicated to the bank of telephones by the tester device.

19. The system according to claim 18 wherein external signals are communicated to the telecommunications device by a switch.

20. The system according to claim 14 wherein the telecommunications device includes a telephone attendant console and external signals are communicated to the telephone attendant console by the tester device.

21. The system according to claim 14 wherein the telecommunications device includes a switch and external signals are communicated to the switch by a tester device.

22. The system according to claim 14 wherein the compound observable state includes a bit map of a display associated with the telecommunications device.

23. The system according to claim 14 wherein the compound observable state includes a text file of a display associated with the telecommunications device.

24. The system according to claim 14 wherein the compound observable state includes characters and attributes of an image displayed on the telecommunications device.

25. The system according to claim 14 wherein at least a portion of the compound observable state is masked in order to hide insignificant information.

* * * * *